United States Patent [19]

Lundström

[11] Patent Number: 4,780,713

[45] Date of Patent: Oct. 25, 1988

[54] DISPLAY DEVICE

[76] Inventor: Jan-Erik Lundström, S-724 81 Västerås, Rustbodsgatan 15, Sweden

[21] Appl. No.: 845,584

[22] Filed: Mar. 28, 1986

[30] Foreign Application Priority Data

Apr. 10, 1985 [SE] Sweden ............................ 8501766

[51] Int. Cl.[4] ........................................ G06F 3/153

[52] U.S. Cl. .............................. 340/750; 340/799; 340/747

[58] Field of Search ............... 340/750, 799, 747, 721, 340/749

[56] References Cited

U.S. PATENT DOCUMENTS

| | | | |
|---|---|---|---|
| 4,074,254 | 2/1978 | Belser et al. | 340/799 |
| 4,131,883 | 12/1978 | Lundstrom | 340/799 |
| 4,392,130 | 7/1983 | Lundström et al. | 340/747 |
| 4,509,043 | 4/1985 | Mossaides | 340/747 |
| 4,591,850 | 5/1986 | Lundstrom | 340/799 |
| 4,660,029 | 4/1987 | Houda et al. | 340/747 |

FOREIGN PATENT DOCUMENTS

| | | |
|---|---|---|
| WO8302509 | 7/1983 | PCT Int'l Appl. . |
| 82039462 | 6/1982 | Sweden . |
| 2059727 | 9/1979 | United Kingdom . |

*Primary Examiner*—John W. Caldwell, Sr.
*Assistant Examiner*—Alvin Oberley
*Attorney, Agent, or Firm*—Witherspoon & Hargest

[57] ABSTRACT

The invention concerns a display device for displaying graphical information, in the form of point patterns forming symbols of an arbitrary size and shape, each symbol being allocated a unique symbol code, as well as in the form of non-symbolic information, on a display unit (8) of a raster-scan type and comprising a symbol memory (13) including information on the point pattern of the available symbols, a pixel oriented image memory (2) including all graphical information to be displayed on the display unit, and a processor (1), by which the symbols incorporated in the image are read into the image memory by processing the information that is stored in the symbol memory. What is characteristic of the invention is a pixel oriented auxiliary memory (3) with the same pixel division as the image memory, each symbol in the image memory (2) corresponding to a pixel in the auxiliary memory, which pixel defines the symbol position in the image. The auxiliary memory is also allocated a row memory (4), each pixel row in the auxiliary memory (3) being allocated a memory cell in the row memory. Furthermore, the row memory is allocated a code memory (5) including the symbol codes for the symbols that appear in the image, each memory cell in the row memory including a pointer (ADDRESS 1, ADDRESS 2, ---) to the memory cell in the code memory (5) that includes the symbol code for the first symbol on the corresponding pixel row in the auxiliary memory (3), and the symbol codes for the remaining symbols on this pixel row being allocated the consecutive memory cells of the code memory.

10 Claims, 7 Drawing Sheets

DISPLAY DEVICE

The present invention concerns an apparatus for displaying and identifying symbols of an arbitrary size and shape on a raster-scan type display unit, each symbol being allocated a unique symbol code.

Most so-called graphical display devices have a pixel oriented image memory, that is an image memory divided into one bit for each picture element or pixel the display screen. A display device with the resolution of 1024×1024 picture elements thus has an image memory of 1024×1024 bits. If the device can show several colours there are several such image memories of 1024×1024 bits, one for each basic colour. These image memories for the different basic colours are usually called bit planes. This set of bit planes forms the total image memory.

When information in the image memory is to be shown on the screen, the contents are read at the rate of the sweep of the electron beam. A digit 1 in the image memory results in the lighting up of a corresponding pixel, so that a lit point is shown at the corresponding coordinate. A zero in the image memory results accordingly in an extinguished pixel on the screen. Thus, it is understood that an image memory containing exclusively ones (1) results in a fully lit image, while an image memory containing exclusively zeros results in a completely extinguished image.

For a colour screen, that is a display device with an image memory consisting of several bit planes according to the above, corresponding bit positions are combined in all bit or image planes. If the bit positions in all image planes that belong to the pixel in question include zeros an extinguished pixel is shown. If only one bit plane includes a digit 1 for the bit position corresponding to the concerned pixel, a lit pixel is shown in an associated basic colour. If several bit planes include ones (1) in bit positions corresponding to the concerned pixel, a lit pixel is shown in a colour constituting a combination of associated basic colours. To simplify the description of the present invention, in the following, the nothing else is stated, only image memories including one bit plane, will be regarded, that is display devices showing one colour only for lit picture elements.

In the display device of the above type there is no interconnection between the bits in the image memory. Each bit is completely independent of all the other bits in the image memory. For example, after the bit pattern of a symbol, such as &, once is written into the image memory, it is, of course, possible to show the point pattern for & on the display screen as long as desired. But the information regarding what bits belong together in the pattern, was lost when the bits were written into the image memory. Thus, it is not a simple task to reinterpret the information that is stored in the image memory. Such a display device is acceptable if the information only is to be presented or copied. If, on the other hand, the display device is to be used in a dialog with the user, where it is required that the computer should be able to identify which symbol the user is pointing at with a cursor or a light pen to replace a symbol with another one, read the information contents (symbol codes) or remove symbols, such a display device would not be acceptable.

A known method to solve this problem consists of extending the image memory with several bit planes, as with a colour screen according to the above. In such a case one bit plane includes the actual image. The other bit planes are used to store the symbol codes for the symbols of the image to which the different picture elements belong. This is done by storing the symbol code in the bit positions of the bit plane that corresponds to the position of the concerned picture element, that is in principle in the same way as the colour coding above. In this way it is possible to mark each picture element on the screen with the symbol code for the symbol to which the picture element or pixel belongs. A drawback with this method is that it is extremely storage consuming. This can be illustrated by assuming we have a display device with a resolution of 1024×1024 pixels. This requires an image memory of 1024×1024 bits, that is 1 Mbit. Furthermore, we assume we have a set of symbols of 1024 different symbols, that is 1024 symbol codes, which requires 10 bits per code. It should be possible to position each of these symbols anywhere on the screen, that is using a so-called "pixel resolution". This requires in its turn that each pixel must be allocated 10 bits for the storing of symbol codes. The image memory, thus, has to be extended by 10 bit planes, that is incorporating totally 11 Mbits. However, normally only part of the image is filled with symbols, that is most of the 1024×1024 positions on the screen are either empty or include purely graphical, non-symbolic information. This spells big storage waste. The present invention concerns a display device, wherein this storage requirement can be reduced on the order of 80 to 90%. Another advantage which is also achieved by the display device according to the invention is increased rapidity, since only one pixel in each symbol needs to be "marked" with the symbol code.

The principles of the invention will now be described below with reference to one simple embodiment, which is illustrated in the appended drawing, wherein.

Figure 1:
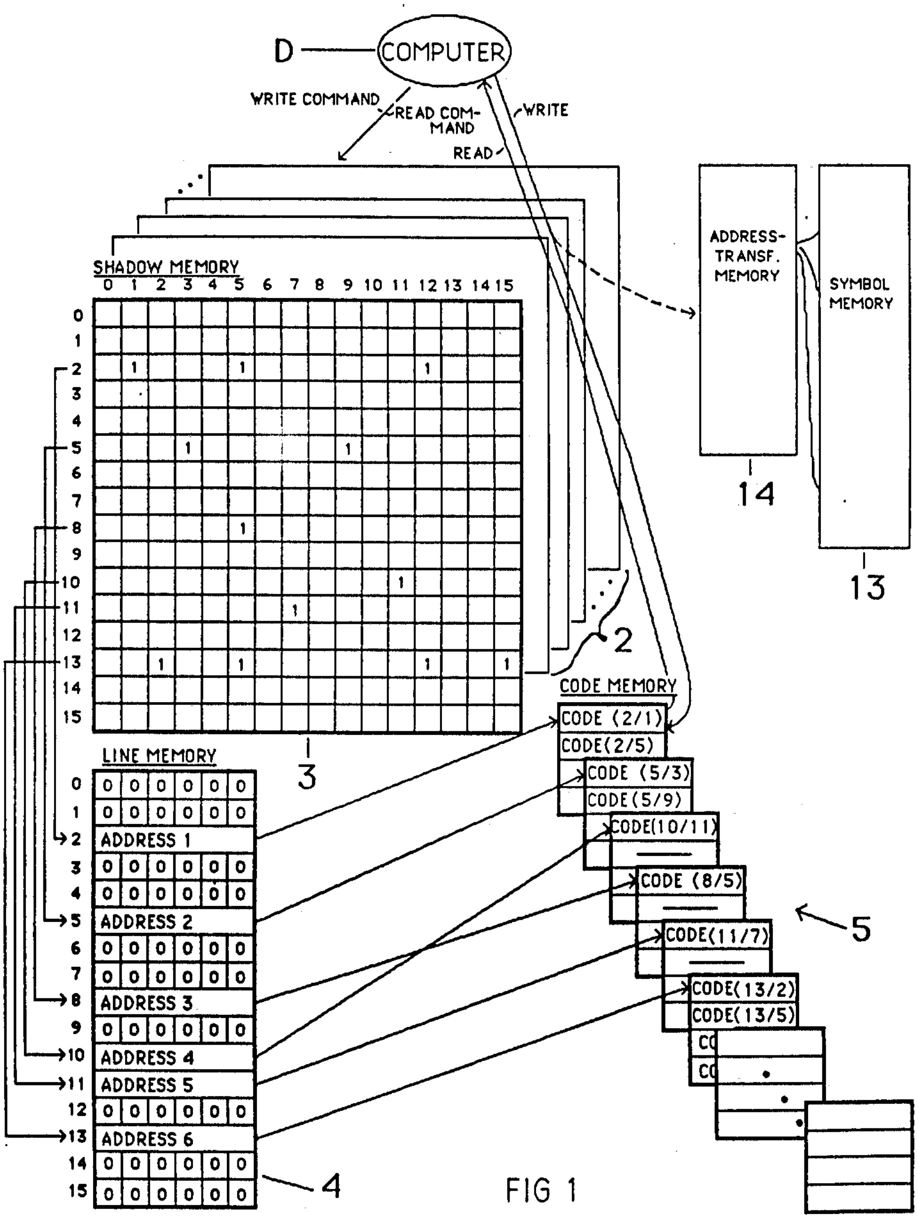
FIG. 1 shows the principle of a display device according to the present invention.
Figure 2:
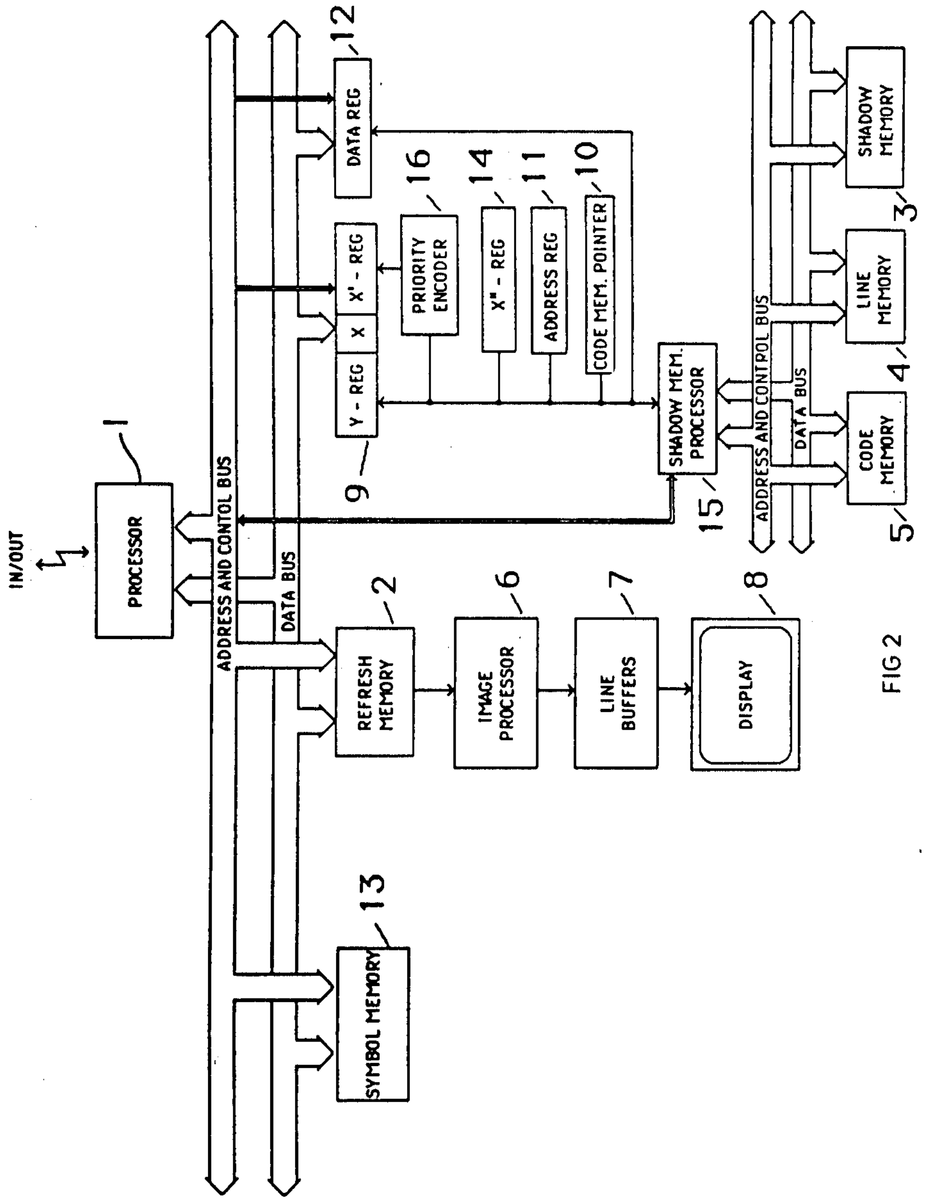
FIG. 2 shows a block diagram of an embodiment according to the invention.

FIG. 1 shows the principle of a display device according to the present invention. A computer D gives orders to a processor 1 for writing or reading (FIG. 2). This processor writes symbols into an image memory 2 and an auxiliary memory 3, respectively reads symbols from the auxiliary memory 3.

The image memory 2 consists of a pixel oriented image memory including as many bit planes as is required for a binary representation of the desired amount of colours. For the sake of simplicity, there is assumed a monochrome display device, that is only one bit plane in the image memory. It is to be understood, however, that the invention is not restricted to this case only, but that the below described principles can also be applied for an arbitrary number of colours.

The auxiliary memory 3 is organized in the same way as a bit plane in the image memory 2. Each time the processor 1 writes a symbol into the image memory 2 a digit 1 is written into the auxiliary or shadow memory 3 in a position that defines the symbol position in the image. This position usually, but not always, corresponds to one of the picture elements that make up the symbol, such as the lower left corner of the symbol. Sometimes, for example in the case of exponents, it can, however, be appropriate to define the position of the symbol by means of a picture element that is lying outside, in the example preferably below the symbol. Through this choice, the reading of text information is simplified, since the position of the symbols in the auxiliary memory can be made to lie on the same row independent of the symbols being ordinary letters, exponents or indices. As the position of the symbol in the image is independent of the colour of the symbol, it is realized that only one bit plane is required for the auxiliary or shadow memory 3, even in a case where the image memory includes several bit planes for displaying colour images.

To simplify the description of the present invention FIG. 1 shows a very limited image memory 2 of 16×16 bits. From the above discussion it is realized that the auxiliary memory 3 will then also include 16×16 bits.

The auxiliary memory 3 is allocated a line or row memory 4. Each memory cell in the line or row memory 4 corresponds to a pixel row in the auxiliary memory 3, that is for the case shown in FIG. 1 the row memory includes 16 memory cells. Those memory cells of the row memory 4, which correspond to a row in the auxiliary memory that contains at least one digit 1 indicating that at least one symbol has been placed on the corresponding pixel row, contain in their turn a pointer or address to a memory cell in a code memory 5. The code memory 5 contains symbol codes corresponding to the symbols included in the image, and the positions of which in the image are indicated by the ones (1) in the auxiliary memory 3. The code memory 5 is divided in the following way. The code for the first symbol on a pixel row in the auxiliary memory 3 is always stored in the cell of the code memory 5 to which the memory cell in the row memory 4 corresponding to that pixel row is pointing. If on this pixel row additional symbols have been marked in the auxiliary memory 3, their symbol codes will be placed in the same order as on the pixel row in the consecutive memory cells of the code memory 5. When there are no more symbols present on the concerned pixel row, a special code, such as the code 0, can be stored in the following memory cell of the code memory 5, in order to indicate this fact. In the example according to FIG. 1 the pixel rows 0 and 1 contain no marks for symbols in the auxiliary memory 3. The line or row memory 4 therefore contains no pointers to the code memory 5. To indicate that fact, zeros have been stored in the corresponding memory cells 0 and 1 of the row memory 4. Row 2 in the auxiliary memory 3, on the other hand, contains position marking ones (1) for three symbols in the X-coordinates 2, 5 and 12, respectively. Thus, the row memory 4 contains a pointer to the memory cell ADDRESS 1 of the code memory. This memory cell contains the sybmol code for the first symbol on row 2 in the auxiliary memory 4 with the X-coordinate 2. The next memory cell in the code memory 5 contains the symbolcode for the next symbol on this row with the X-coordinate 5. Thereafter the symbol code for the symbol with the X-coordinate 12 on row 2 in the auxiliary memory 3 is stored in the code memory 5.

Since symbols have been marked on the pixel rows 5, 8, 10, 11 and 13 in the auxiliary memory 3, the memory cells 5, 8, 10, 11 and 13 in the line or row memory 4 are pointing in the same way as above, to corresponding addresses ADDRESS 2, ADDRESS 4, ADDRESS 3, ADDRESS 5 and ADDRESS 6, respectively, in the code memory 5. In these memory cells, the address of which defines the starting point for those memory segments in the code memory 5 that correspond to pixel rows containing symbols, the symbol code is stored in analogy with the above, for the first symbol on respective pixel row. The symbol codes for possibly additional symbols on respective pixel row are stored after the first symbol code in corresponding memory segments of the code memory 5. It is to be noted that these memory segments do not necessarily have to be in the same consecutive order as the pixel rows. This has been indicated in FIG. 1 by the pointer in the row memory 4 corresponding to pixel row 8, pointing to ADDRESS 4 in the code memory 5, which address is higher than the address for the memory cell ADDRESS 3 corresponding to the pixel row 10. The physical locus of the memory segment of the code memory 5 is, thus, not of importance. Furthermore, the length of the memory segments can be variable, depending on the number of symbols on the different pixel rows. To indicate that there are no more symbols present on a pixel row, corresponding memory segments of the code memory 5 can be ended by a terminal code, for example the code 0. Additionally, it is possible to represent the memory segments as lists in for example the programming language LISP. For each memory cell with a symbol code there is a pointer connected to the following symbol code for the concerned pixel row. The memory cell of the last symbol code is connected to a pointer to a special terminal cell, which is common to all memory segments and which indicates that no additional symbols are present on the row. Such an organization of the code memory 5 is called dynamical memory allocation.

In accordance with a particularly simple embodiment of the invention, the code memory 5 is organized in consecutive memory segments, the length of which corresponds to the maximum number of symbols that normally can be expected on a row. In this case, if still more symbols are to be contained on a pixel row, the last memory cell in the corresponding memory segment of the code memory 5 can contain a pointer to an address outside of the ordinary code memory, where a new memory segment is reserved for the last symbol that normally should have been contained in the original memory segment and for the remaining symbols. For the below description of a simple embodiment of the invention according to FIG. 2, it is assumed, for the simplicity of the discussion, that each row can contain maximally four symbols, that is for each memory segment there are reserved four memory cells in the code memory 5. If a row contains fewer than four symbols, the corresponding memory segment of the code memory is ended by a terminal code, for example zero as above, after the symbol code for the last symbol on the row. The remaining memory cells of the segment will then be unutilized.

A simple embodiment of the invention will now be described with reference to FIGS. 2–6.

FIG. 2 shows a block diagram of this embodiment. The structure and function of it will be described with help of flow charts in FIGS. 3 and 4, which show sequential writing and reading respectively, of symbols.

The processor 1 receives write and read commands as well as data from a computer. Through an address and control bus as well as through a data bus, the processor 1 controls data flow to and from, respectively, the image memory 2. The image, which is shown, is read from the image memory by means of an image processor 6 and displayed via line buffers 7 on a display unit 8.

Figure 3:
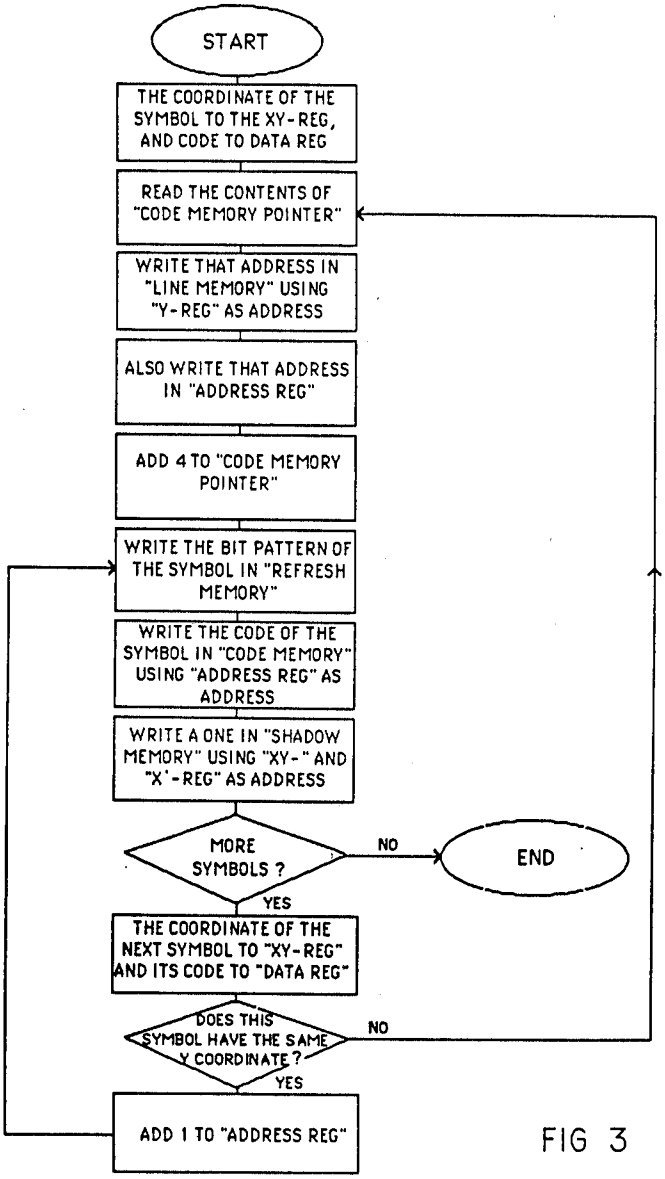
FIG. 3 shows a flow chart for writing a symbol.

Initially, sequential writing of symbols is described, with reference to FIGS. 2 and 3.

The coordinates of the first symbol are loaded by a processor 1 in a register 9 with the register fields Y, X, and X'. This processor 1 also loads the symbol code in a data register 12. Thereafter, an auxiliary or shadow memory processor 15 reads the contents of a code memory pointer 10. It contains a pointer to the first memory cell in the next available memory segment of the code memory 5. The row or line memory cell corresponding to the contents of register field Y is filled by the auxiliary memory processor 15 with the contents of the code memory pointer 10, that is this cell in the row memory 4 will point to the first memory cell in the next available memory segment of the code memory 5. The auxiliary memory processor 15 also writes the contents of the code memory pointer into an address register 11 designated always to point to the current memory cell of the concerned memory segment. The code memory pointer 10 is then up-dated, so that it points to the next available memory segment of the code memory. Under the above given conditions, four is allways added to the code memory pointer, since each row is assumed to have maximally four symbols.

Now it is time for the processor 1 to write the bit pattern of the current symbol into the image or refresh memory 2. The code for the symbol is stored in a data register 12. To be able to transfer the bit pattern corresponding to this code to the image or refresh memory 2, the display device has a symbol memory 13, in which there is stored information regarding the bit patterns corresponding to the available symbol codes. An appropriate structure of this information and a method to write the bit pattern for the concerned symbol are described in the U.S. Pat. No. 4,131,883 and is not an object of this invention. The advantage with this method is that symbols of arbitrary size and form can be positioned anywhere in the image, that is with pixel resolution. The method is based on the use of an address transformation, the symbol code being inputted in an address transformation memory 14 (FIG. 1) which converts the code to the address in the symbol memory 13 where the definition of the symbol starts. In this way it will be possible to reserve different size memory areas in the symbol memory for the different symbols.

After the bit pattern of the symbol has been written into the image or refresh memory, the symbol is ready for a display on the display unit. For the information regarding presence and position of the symbol in the image not to get lost, the auxiliary or shadow memory processor 15 writes the code of the symbol into the code memory 5 in the memory cell pointed to by the address register 11. Additionally, the position of the symbol is indicated in the image by a digit 1 being written into the auxiliary memory in a bit position given by the contents in register 9.

The auxiliary memory processor 15 then signals to the processor 1 that the symbol has been written, and, in addition, wants to know if more symbols are to be written. If that is not the case, the writing sequence is over. Otherwise the processing will continue to the next block of the flow chart of FIG. 3. At this step, the processor 1 writes the coordinates of the next symbol in register 9 and its code in data register 12. Thereafter the processor 1 signals to the auxiliary memory processor 15 that there is a new symbol to be processed.

In the next step the processor 15 checks if the next symbol belongs to the same pixel row, that is if it has the same Y-coordinate as the previous symbol. If that is the case, 1 is added to the contents of address register 11, so that this register points to the next memory cell in the concerned memory segment of the code memory 5. Then the steps: writing of the bit pattern into image memory 2, writing of the code into code memory 5 and writing of the position into auxiliary memory 3 for the new symbol, are repeated. This procedure is repeated until all symbols on the concerned row have been processed.

If the symbol does not have the same Y-coordinate as the previous symbol, the following steps are instead carried out: reading of the contents of code memory pointer 10, writing of the address into row memory 4, writing of address into address register 11, writing of the bit pattern into image memory 2, writing of the code into code memory 5 and writing of the position into auxiliary memory 3.

When all symbols on the last pixel row have been processed, the block "END" is finally reached.

Figure 4:
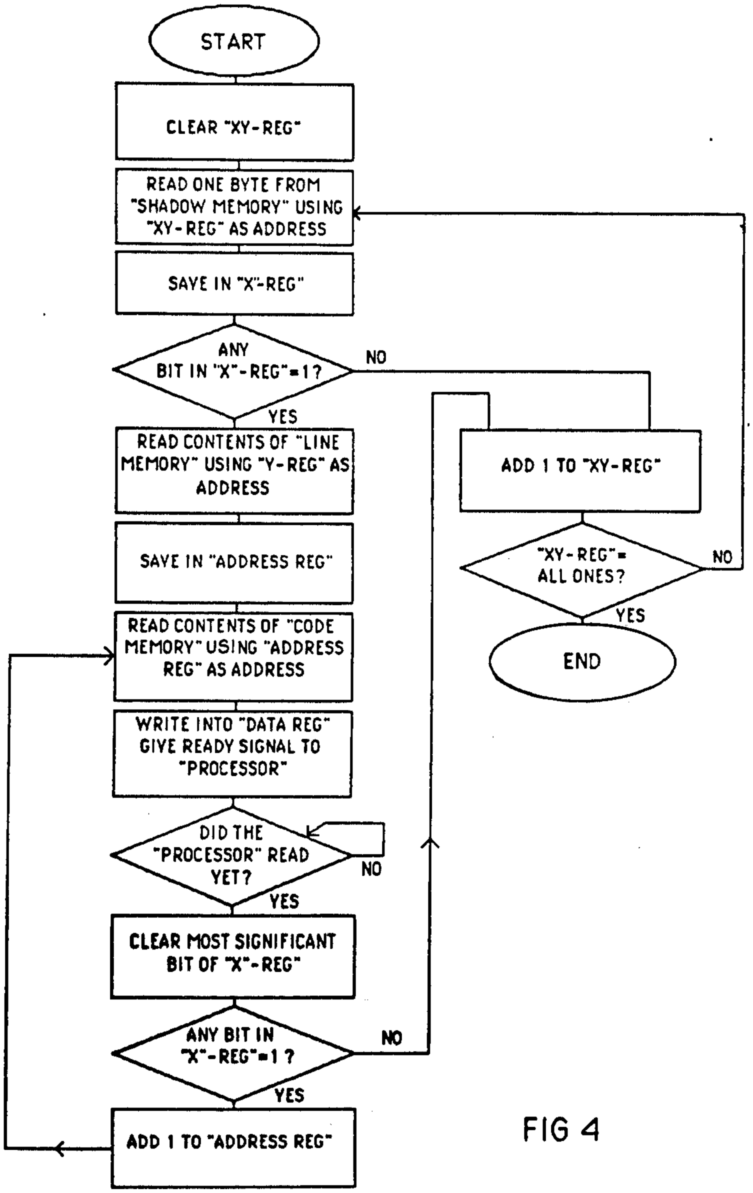
FIG. 4 shows a flow chart for reading the symbols stored in the image memory, FIGS. 5(*a*) and 5(*b*) show the principle for identifying an appointed symbol.

A sequential reading of symbols from the memory will now be described, with reference to FIGS. 2 and 4.

Before the description of a sequential reading starts, the reason for dividing the register 9 into three fields Y, X and X' will be further explained. In the present example (a display device of 16×16 pixels) the whole register 9 can have a length of 8 bits (one byte). The Y-field or Y-register can occup four of these bits, the X-field or X-register can occupy one bit, and the X'-field or X'-register three bits. The reason for dividing the register into these fields is that Y: suffices as address to the row memory 4, Y+X: is needed as address to the auxiliary or shadow memory 3, and Y+X+X': (that is the whole register 9) comprises the complete coordinate information of the symbol.

First the register fields X and Y in the register 9 are cleared by the auxiliary memory processor 15, that is the reading starts on the first pixel row. The contents of the fields X, Y of register 9 are now used for reference to the first memory cell of the auxiliary memory 3, for example with the length of 1 byte or 8 bits. The contents of this first memory cell are stored in an X"-register 14. Thereafter a test is made in a priority decoder 16 whether this register contains 1 (one) in any position, that is if this memory cell contains any symbol mark. If that is the case, the first memory cell in the row memory 4 is read. This cell contains the address to the first symbol code in the code memory 5 for this pixel row. This address is stored in the address register 11. After that, the address register 11 is utilized for reading the symbol code of this address. The symbol code is stored in data register 12. The processor now has all necessary information on the concerned symbol, namely the coordinates of the symbol inthe X-, Y- and X'-fields of register 9 and the symbol code in the data register. The auxilairy memory processor 15 now waits until the processor 1 has read this information.

Thereafter, the most significant bit of the X"-register 14 is cleared, that is the bit that corresponds to the first pixel position on the row. Because, if there is a symbol in this position, this symbol has already been processed in the previous step. It is thereafter tested if more symbols are marked in the first memory cell of the auxiliary memory, that is if the X"-register contains a one (1). If that is the case, 1 is added to the address register and the next symbol is read from the code memory 5 according to the above.

Eventually the X''-register will not contain any more ones (1), which means that there are no more symbols present in this memory cell of the auxiliary memory 3. Then a one (1) is added to the fields X, Y, or register 9, that is the register is updated for the access of the next memory cell in the auxiliary memory 3.

The above process is repeated until the X-, Y-fields of register 9 contain solely ones (1). At this stage the last memory cell in the auxiliary memory 3 has been reached. After having tested this memory cell as well with regard to the contents of ones (1), the sequential reading is terminated.

The erasing of a symbol is now described with reference to FIGS. 5 and 6.

The erasing occurs in two steps. In the first step a symbol is pointed to and identified, and in the second step the identified symbol is erased. Initially the identifying process will be described more in detail, with reference to FIGS. 5*a* and 5*b*.

Figure 5A:
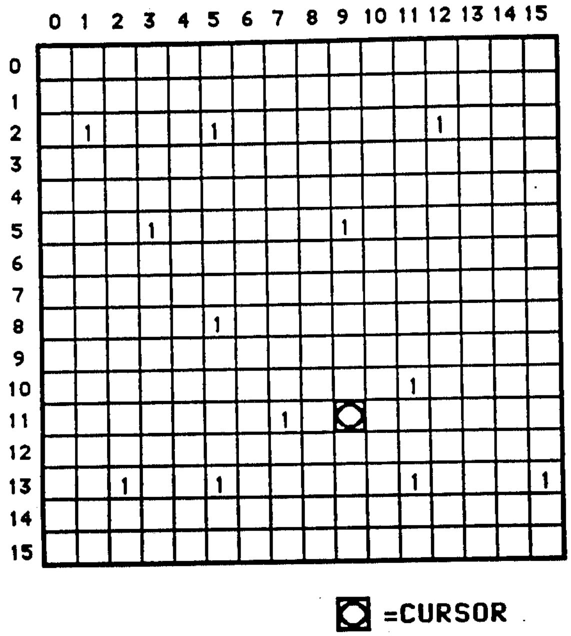
Figure 5B:
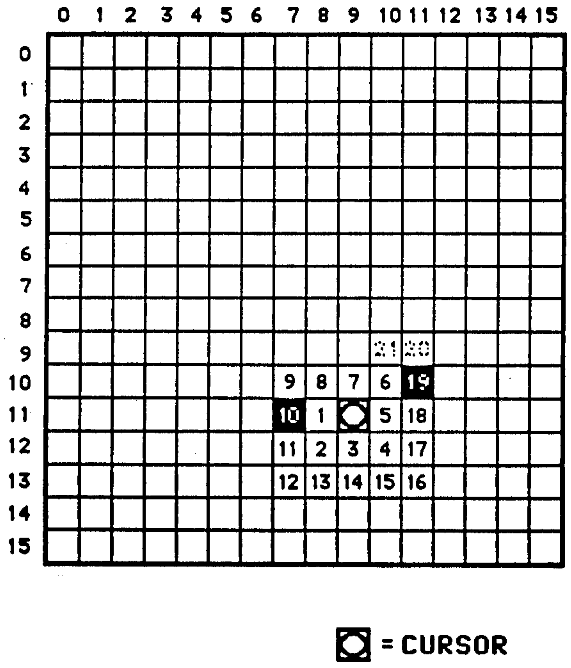

FIGS. 5*a* and 5*b* show the auxiliary memory 3 and contain the same bit pattern as in FIG. 1. When the operator works against the screen, he has a cursor for help. He can move the cursor with help of keys, mouse, roll ball, light pen or similar. Suppose, the operator has moved the cursor to the coordinates 9, 11 (X, Y), as in FIG. 5*a*. There he has "hit" a symbol's bit pattern. For the sake of simplicity, we assume that the bit pattern hit by the operator belongs to the symbol that is indicated in the point 11, 10 (X, Y). The operator now gives the order that the symbol be erased by for instance pushing an erase key.

Since it is not certain that the position of the cursor in the image coincides with the symbol indication in the auxiliary memory 3 for the concerned symbol (as in this case), the system first has to check to which symbol the operator refers. First it is checked whether there is a bit mark in the auxiliary memory 3 with the same coordinates as the cursor. That is not the case in the above example. This is then followed by a corresponding check of coordinates around the cursor position. The consecutive order for these tests has been indicated in FIG. 5*b*. From the same figure it becomes evident that the search takes place in a spiral around the cursor position. In the example the spiral search occurs counter-clockwise, but it could as well have occurred clockwise. Furthermore, it is realized that the search does not necessarily have to be carried out in a spiral around the cursor position, but that any algorithm that guarantees that all coordinates are checked, is applicable.

In the above example the check condition will for the first time be fulfilled in the coordinates 7, 11, which in FIG. 5*b* has been given test number 10. The symbol code for this point is found in the code memory 5. Now the symbol memory 13 is searched for checking whether the cursor is situated within the bit pattern of the symbol. The examination of the bit pattern of the symbol can be done for example according to what has been disclosed by U.S. Pat. No. 4,131,883. In the shown example the cursor will not be within the concerned symbol, and the search will continue. It is not until in position 11, 10 (indicated in FIG. 5*b* by test number 19) that the next "hit" is received, and there it also appears that the cursor position is within the bit pattern of the symbol. Since the correct symbol now has been identified, the desired erasing can take place by writing zeros (0) into the image memory, auxiliary memory and code memory for the concerned symbol. An erasing in the image memory can be done for example according to what has been disclosed by U.S. Pat. No. 4,131,883.

Figure 6:
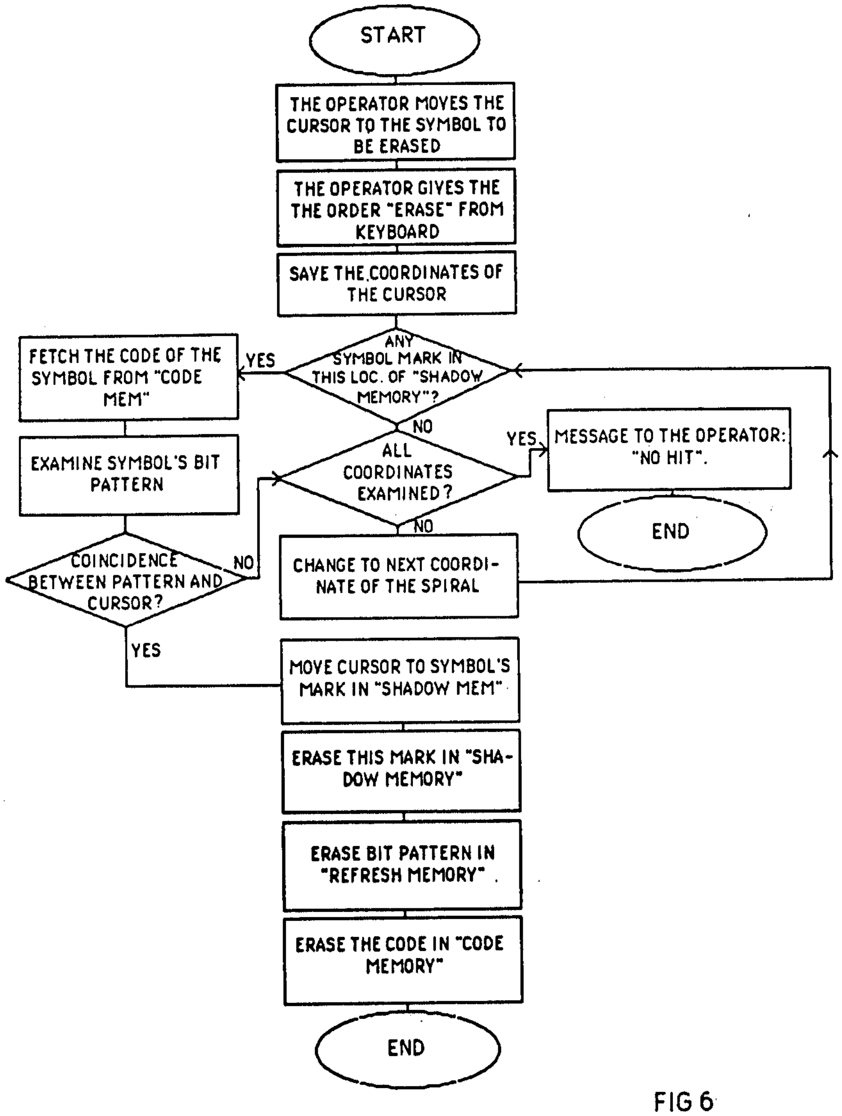
FIG. 6 shows a flow chart for erasing a symbol.

The above described search schedule is described in detail in the flow chart of FIG. 6. As is evident from FIG. 6, the cursor can, after identifying an appointed symbol, be moved to the symbol indication in the auxiliary memory 3, if this is desirable. This step is, however, not necessary.

If instead of just erasing the symbol, it is desired to replace it by a new symbol, the new symbol is written into the image memory in the location of the erased symbol. This is done according to the flow chart of FIG. 3.

In the above, the invention has been described with reference to an example of an embodiment with very low resolution. Such a poor resolution (16×16 pixels) is, of course, not applicable in practice. Below will therefore be discussed the storage requirement of a more realistic resolution of 1024×1024 pixels. Furthermore, a symbol set of 4096 symbols is assumed. It is also assumed that an image maximally contains approximately 128 rows of 160 symbols. Under these conditions the following comparison with the known method for symbol representation and the present invention, is relevant. The known method requires:

$$1024 \times 1024 \times 12 \text{ bits} = 1{,}572{,}864 \text{ bytes}$$

for storing the position and code of the symbols in the image. In addition at least one further bit plane is required for storing the bit pattern of the symbols for display.

In accordance with the invention and under the same conditions (each memory cell contains 2 bytes or one word) the following is required:

| | | | |
|---|---|---|---|
| AUXILIARY MEMORY: | 1024×1024 bits = | 131 | 072 bytes |
| ROW MEMORY: | 160 words = | | 320 bytes |
| CODE MEMORY: | 128×160 words = | 40 | 960 bytes |
| or in total: | | 172 | 352 bytes |

that is, only 11% of the earlier storage requirements. Nor in this case has the storage requirement for storing the bit pattern of the symbols been included. This requirement is the same in both cases.

From the above comparison it is appreciated that the invention brings about an important saving as for storage requirement. For a higher resolution and/or bigger symbol sets, this saving will be even bigger.

It has also proven that the present invention leads to a considerable speed-up of the display device processing in relation to the prior art.

As regards hardware, the processor 1 and auxiliary memory processor 15 may, for example, comprise one of the processors Z80, 6809. For a higher image resolution for example one of the processors 68000 or 80286 would be more appropriate. However, it is not necessary that both processors comprise the same microprocessor. Also combinations thereof are conceivable.

For explanatory reasons only a simple embodiment of the invention has been described above, with reference to the Figures. It is to be realized that the invention can be modified in many ways within the scope of the inventive idea, which is only restricted by the appended patent claims. One realizes for example that the row memory 4 may instead be comprised of a column memory including a pointer to a code memory for those columns in the auxiliary memory 3 that include symbol marks.

I claim:

1. Apparatus for displaying and identifying symbols of an arbitrary size and shape on a raster-scan type display unit, each symbol being allocated a unique symbol code, comprising:

a symbol memory including information on point patterns of available symbols, a pixel oriented image memory comprising a plurality of pixel rows and pixel columns, the pixel oriented image memory including all graphical information to be displayed on the display unit, a processor, by which symbols in an image are read into the pixel oriented image memory by processing information that is stored in the symbol memory, an auxiliary memory having the same number of pixel rows and pixel colunns as the pixel oriented image memory, each symbol in the pixel oriented image memory corresponding to a marked pixel in the auxiliary memory, which marked pixel defines the position of the corresponding symbol in the image, a row memory allocated to the auxiliary memory, each pixel row in the auxiliary memory being allocated a memory cell in the row memory, and, a code memory including the symbol codes of all the symbols that appear in the image, each memory cell in the row memory storing either (1) a pointer to an ordered collection of code memory cells, each cell in the collection of code memory cells storing the symbol code of a corresponding symbol on the corresponding pixel row of the auxiliary memory, so that the order of the code memory cells in the ordered collection of code memory cells corresponds to the order in which the symbols appear in the corresponding pixel row of the auxiliary memory or (2) a pointer to a code memory cell indicating there are no symbols on the corresponding pixel row of the auxiliary memory.

2. The display device according to claim 6 including an auxiliary memory processor for the writing and reading of information into and from, respectively, the auxiliary memory, the row memory and the code memory.

3. The display device according to claim 2, including a coordinate register and a data register connected to the axuiliary memory processor, for storing symbol coordinates and symbol codes, respectively, in the auxiliary memory.

4. The display device according to claim 2, including address registers that are connected to the auxiliary memory processor and code memory pointers for storing of addresses to the row memory and the code memory, respectively.

5. The display device according to claim 3, including address registers that are connected to the auxiliary memory processor and code memory pointers for storing of addresses to the row memory and the code memory, respectively.

6. Apparatus for displaying and identifying symbols of an arbitrary size and shape on a raster-scan type display unit, each symbol being allocated a unique symbol code, comprising:

a symbol memory including information on point patterns of available symbols, a pixel oriented image memory comprising a plurality of pixel rows and pixel columns, the pixel oriented image memory including all graphical information to be displayed on the display unit, a processor, by which symbols in an image are read into the pixel oriented image memory by processing information that is stored in the symbol memory, an auxiliary memory having the same number of pixel rows and pixel columns as the pixel oriented image memory, each symbol in the pixel oriented image memory corresponding to a marked pixel in the auxiliarly memory, which marked pixel defines the position of the corresponding symbol in the image, a column memory allocated to the auxiliary memory, each pixel column in the auxiliary memory being allocated a memory cell in the column memory, and, a code memory including the symbol codes of all the symbols that appear in the image, each memory cell in the column memory storing either (1) a pointer to an ordered collection of code memory cells, each cell in the collection of code memory cells storing the symbol code of a corresponding symbol on the corresponding pixel column of the auxiliary memory, so that the order of the code memory cells in the ordered collection of code memory cells corresponds to the order in which the symbols appear in the corresponding pixel column of the auxiliary memory or (2) a pointer to a code memory cell indicating there are no symbols on the corresponding pixel column of the auxiliary memory.

7. The display device according to claim 6, including an auxiliary memory processor for the writing and reading of information into and from, respectively, the auxiliary memory, the column memory and the code memory.

8. The display device according to claim 7, including a coordinate register and a data register connected to the auxiliary memory processor for storing symbol coordinates and symbol codes, respectively, in the auxiliary memory.

9. The display device according to claim 7 including address registers that are connected to the auxiliary memory processor and code memory pointers for storing of addresses to the column memory and the code memory, respectively.

10. The display device according to claim 8, including address registers that are connected to the auxiliary memory processor and code memory pointers for storing of addresses to the column memory and the code memory, respectively.

* * * * *